United States Patent [19]
Fornal, Sr.

[11] Patent Number: 5,299,380
[45] Date of Patent: Apr. 5, 1994

[54] RODENT ENCLOSURE

[76] Inventor: Robert W. Fornal, Sr., P.O. Box 2083, Sandwich, Mass. 02563

[21] Appl. No.: 986,452

[22] Filed: Dec. 4, 1992

Related U.S. Application Data

[63] Continuation-in-part of Ser. No. 614,859, Jul. 3, 1991, abandoned.

[51] Int. Cl.$^5$ .............................................. A01K 69/06
[52] U.S. Cl. .............................................. 43/66; 43/69
[58] Field of Search ................ 43/69, 64, 65, 66, 67, 43/73, 74, 61, 60

[56] References Cited

U.S. PATENT DOCUMENTS

| | | | |
|---|---|---|---|
| 96,946 | 11/1869 | Nampel. | |
| 133,557 | 12/1872 | Baddeley | 43/67 |
| 331,945 | 12/1885 | Crowe | 43/69 |
| 425,136 | 4/1890 | Latta | 43/67 |
| 596,990 | 1/1898 | Frampton | 43/69 |
| 1,016,405 | 2/1912 | Ferguson | 43/69 |
| 1,668,726 | 5/1928 | Mueller | 43/69 |
| 4,048,745 | 9/1977 | Morford. | |
| 4,590,703 | 5/1986 | Cutter | 43/60 |
| 4,829,700 | 5/1989 | Ha | 43/61 |

FOREIGN PATENT DOCUMENTS

| | | | |
|---|---|---|---|
| 0509329 | 4/1928 | Fed. Rep. of Germany | 43/67 |
| 0080784 | 4/1919 | Switzerland | 43/69 |
| 0184555 | 6/1936 | Switzerland | 43/69 |

*Primary Examiner*—Richard K. Seidel
*Assistant Examiner*—James Miner
*Attorney, Agent, or Firm*—Thomas A. Kahrl

[57] ABSTRACT

An enclosure housing for capturing a live rodent unharmed having a baited enclosure chamber, a one way entrance, having an open portal, a level ramp, pivotally mounted in the entrance portal chamber of the enclosure adapted for movement between a level access position and an inwardly and downwardly tilted position to provide access and to automatically return to the level position for preventing escape. Also provided is a series of parallel barrier walls and a sliding top adapted for movement between a closed entrapment position and an open release position. The enclosure preferably to be constructed of transparent plexiglass.

8 Claims, 3 Drawing Sheets

RODENT ENCLOSURE

BACKGROUND OF THE INVENTION

This application is a Continuation-In-Part of U.S. patent application Ser. No. 07/614,859, filed Jul. 3, 1991 now abandoned, which is incorporated herein by reference.

The invention relates to a humane rodent trap, more particularly a mouse trap adapted for trapping a mouse in first location and for transporting the mouse to a second location for release in an unharmed condition. Traditionally, rodent traps have been directed toward eliminating indoor rodents by traps constructed to either kill a rodent or with a baited trap, trap for drowning. Clearly, the most well known such trap is the "Victor Trap," R which uses a spring-loaded hasp with a trigger mounted bait for attracting and killing mice and rats. However, more recently it has become popular to trap animals in a more humane manner such that they can be removed from the location where they are not desired, and released into the wild, unharmed. An early development in this field has been "Havahart Traps." R The Havahart Trap has an open case like body with a dual entrance at either end with doors connected to a bait tray for closing the dual doors, thereby trapping the animal inside.

Applicant is aware of other prior art rodent trap enclosures. One such trap enclosure is disclosed in U.S. Pat. No. 96,946 issued Nov. 16, 1869 to Nampel, where an upwardly inclined false bottom for trapping rats to be subsequently disposed of by drowning. Nampel is directed toward trapping rats, and as such, has a fully secured top and a heavily weighted outward end to the false bottom to ensure that the rat did not escape, with possible harm to the user. A trap enclosure with a removable top is disclosed in U.S. patent application Ser. No. 4,048,745 issued Sep. 20, 1977 to Morford, which discloses a housing with passageways and ramps at opposite inlet end openings having a sliding lid having a transparent portion over the holding compartment, an opaque portion over the passageway. Neither of these prior art devices teaches a open entry with a level ramp adapted for downwardly and inwardly tilting, particularly an enclosure constructed entirely of transparent material such that the bait is at all times visible from the outside of the enclosure.

SUMMARY OF THE INVENTION

The present invention relates to a rodent enclosure apparatus with a pivotally mount level tilting ramp for providing a humane trap that is small, light in weight, easy to handle and can be placed conveniently in any small area. In operation bait, typically in the form of a ball of peanut butter, is placed at one end of the enclosure by sliding the movable top of the trap off in either direction.

In the preferred embodiment, the trap is constructed of transparent plexiglass such that the trapped animal is visible form a distance. The top of the trap is constructed to slide off for quick and easy disposal of the live trapped animal. The design of the trap incorporates a minimum of parts having no springs, hinges or dart devices such that the trap can be used by children as well as adults, and is humane in character in that it does not kill or harm the trapped animal, and allows the user to relocate the animal from the typical dwelling location to a distant location in the wild. In particular, the invention relates to an improved rodent trap that is so constructed that when the trap is activated the animal is humanely captured, the trap may be utilized to facilitate the disposal of the animal without possible harm to the animal or to the user.

In the preferred embodiment, the enclosure includes a housing being formed of four solid walls, four solid partitions, including two side walls, a floor and a slidable top, the enclosure being elongated in shape, of rectangular construction with a barrier at the trap end having a small opening to permit the scent of the trap to escape. In the preferred embodiment, pivotally mounted for tilting, the barrier at the trap end is a transparent plastic wall.

The enclosure is provided with a level pivotally mounted for tilting adapted to move between a level entrance position and a downwardly inclined position, which is activated by the weight of the rodent/varmint. When the tilting ramp mechanism is activated by the entrance of such an animal, the varmint enters a confined area which is virtually impossible to escape from once the tilting ramp has automatically returned to its normally level position.

In an alternate embodiment, the barriers are constructed of a plurality of bars, typically stainless steel nails at one end, with a partial wall in the middle to prevent the animal from escaping or chewing the bars. Typically the animal enters at the open end to retrieve bait placed at the opposite end, In the alternate embodiment, the trap contains a fixed floor ramp and an immediately adjacent level pivoted ramp that moves in a see-saw fashion. The weight of the animal forces the ramp into a downward position depositing the animal at the far end of the approach of the enclosure chamber of the trap where the bait is located. In this embodiment the tilting ramp automatically returns to the level position due to the balancing of the ramp on the pivot points, there being a plurality of pivot points positioned in the two side walls, thereby trapping the animal and blocking the entrance, such that there is no exit. The animal is now trapped in the enclosed chamber area of the trap whereby removal can only be made by the opening of the sliding top.

The tilting ramp is typically mounted in the portal chamber for movement between a normally level entry position as shown in FIG. 2 and a inwardly and downwardly tilted position as shown in FIG. 3 to provide access to the inner baited chamber of the enclosure. As is shown in FIG. 2, the enclosure chamber includes having a bait receiving area on the floor which is in the line of sight of a rodent when entering the open portal. As is shown in FIG. 2, bait formed in a ball of at least ½" diameter adapted to be positioned in the bait receiving means via access through the controlled egress means wherein the rodent on being attracted to the rodent enclosure by the bait, which is visible from outside the enclosure and having openings for scenting, and upon approaching the open portal, is presented with the open portal with the ramp in a level position. Upon entering the open portal and proceeding inwardly toward the bait as the rodent/varmint passes the pivot point of the ramp, the weight of the rodent being operative to depress the inward end of the ramp downwardly, the ramp tilts inwardly and downwardly wherein an inner entrance space is provided below the upper partial barrier section and the floor, providing access for the rodent to exit the ramp and enter the inner chamber in pursuit of the bait. The slightly greater weight of the entrance portion of the ramp causes the ramp to return to its normal level position closing the access way to the inner chamber, thereby enclosing the rodent within the inner chamber with no means of egress.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

DETAILED DESCRIPTION OF THE PREFERRED EMBODIMENT

Figure 1:
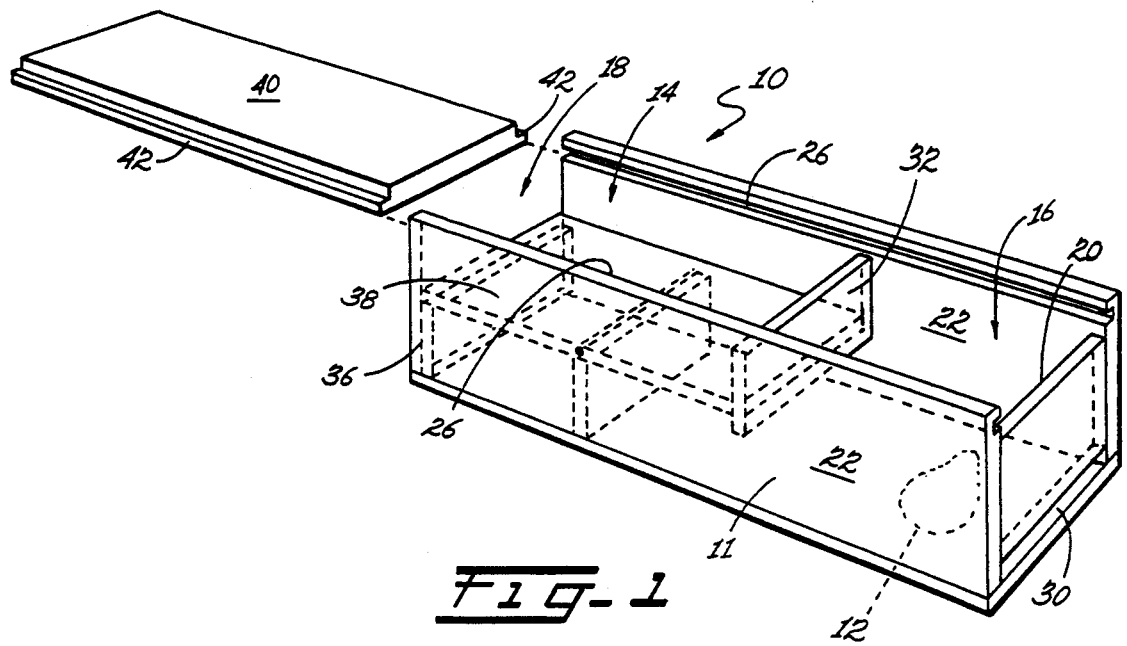
FIG. 1 is an illustrated perspective view from above of the rodent enclosure of the invention showing the preferred embodiment with the sliding top in the detached position.
Figure 2:
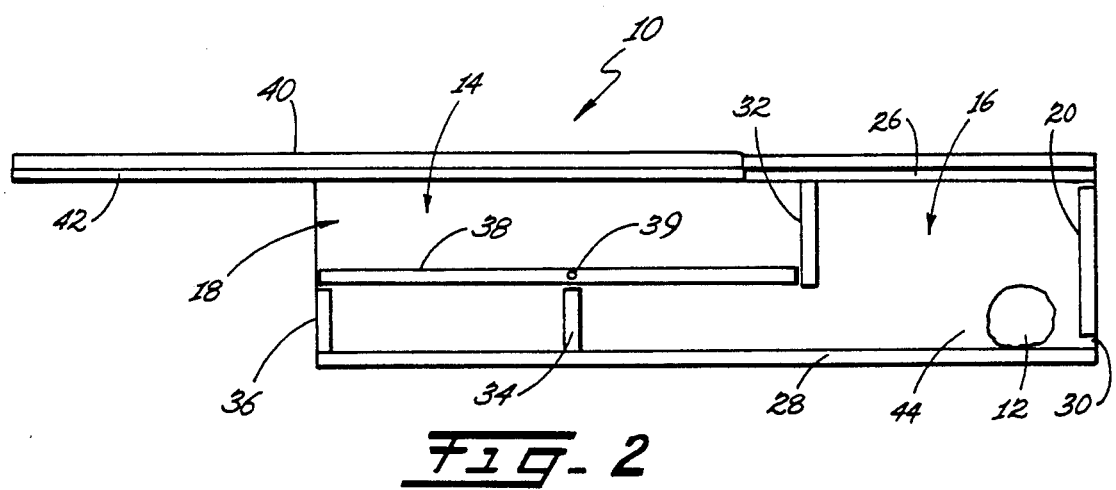
FIG. 2 is a vertical section taken substantially along section line 2—2 of FIG. 1, showing the details of construction of the rodent enclosure, and showing the level of ramp in the level entrance position.
Figure 3:
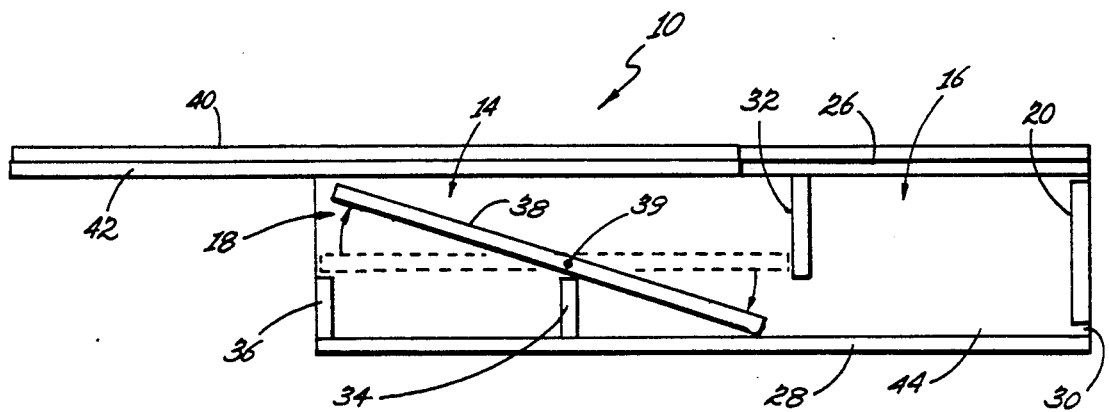
FIG. 3 is a second vertical section as shown in FIG. 2 showing the level ramp in the tilted downwardly inclined position.
Figure 4:
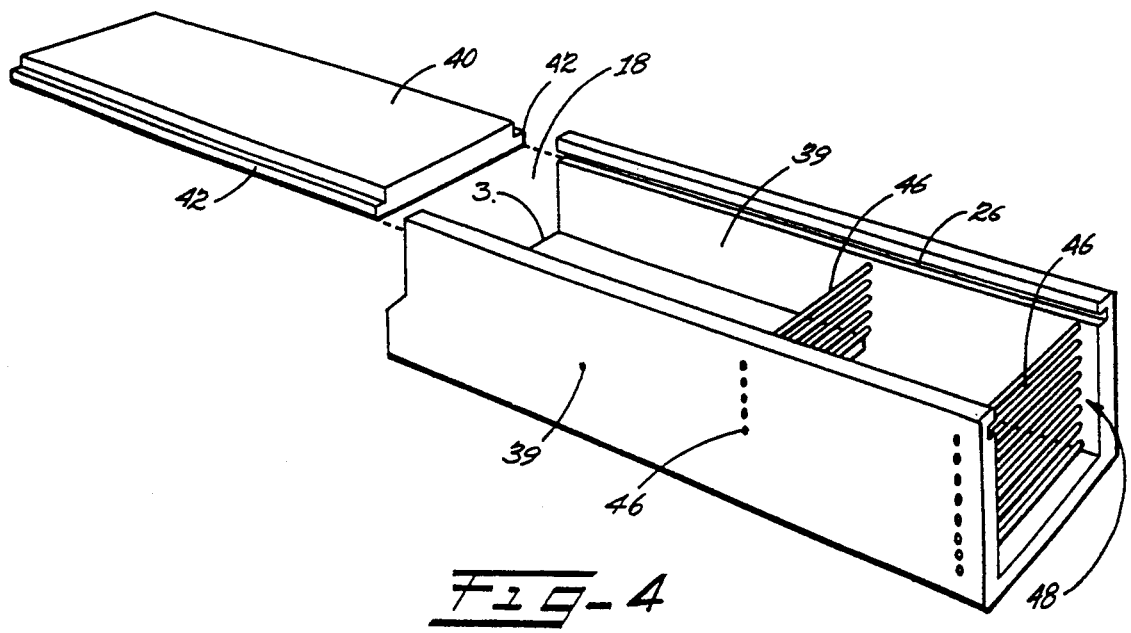
FIG. 4 is a perspective view of an alternate embodiment of the rodent trap of the present invention.
Figure 5:
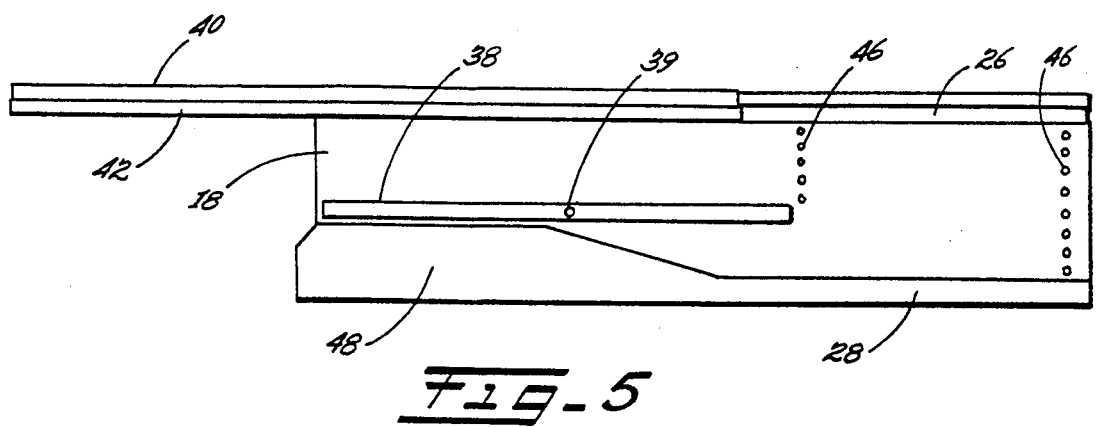
FIG. 5 is a vertical section taken along section line 5—5 of FIG. 4, showing the details of the construction of the alternate embodiment rodent enclosure of the invention.
Figure 6:
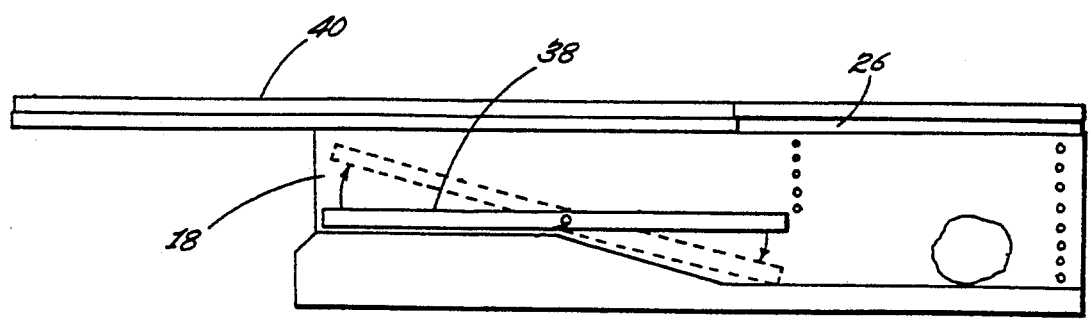
FIG. 6 is a second vertical section as shown in FIG. 5 showing the level ramp in the tilted position, and includes a ball of bait in the inner chamber.
Figure 7:
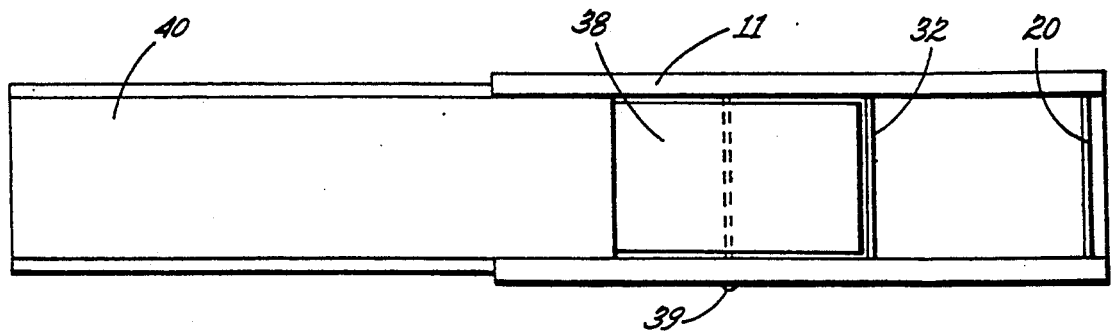
FIG. 7 is a top plan view of the rodent enclosure of FIG. 1.
Figures 8, 9:
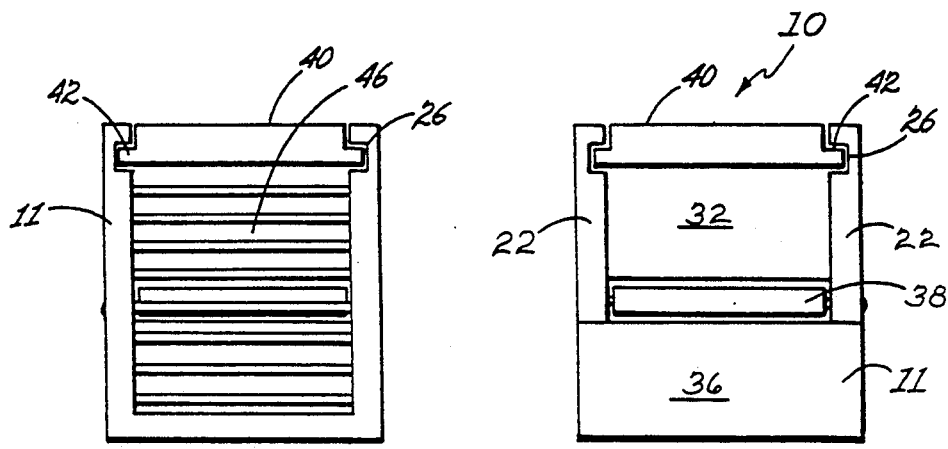
FIG. 8 is an end view of the rodent enclosure of FIG. 4.
FIG. 9 is a front view of the rodent enclosure of FIG. 1.
Figure 10:
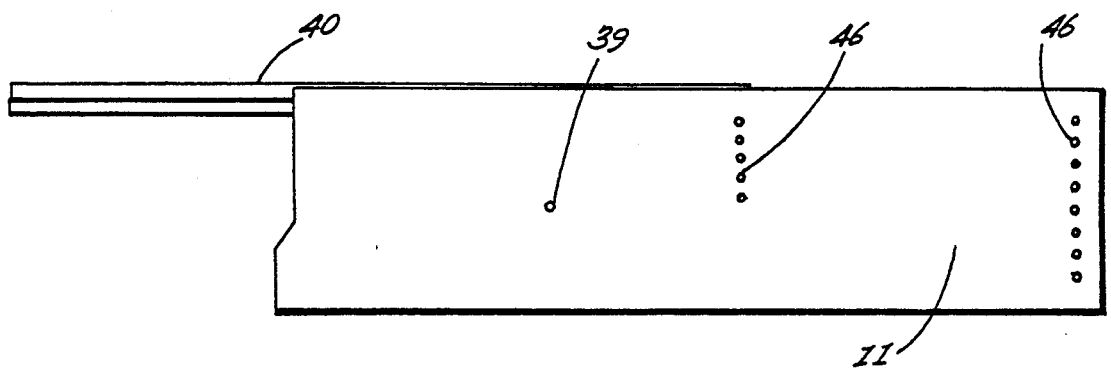
FIG. 10 is a side view of the rodent enclosure of FIG. 4.

With reference to the drawings, FIGS. 1, 2, and 3 show a rodent enclosure 10 for humanely trapping a rodent, such as a mouse, with bait 12 including having a housing 11 including a portal chamber 14 and an enclosure chamber 16 adapted to receive a segment of bait having an open entry 18 at one end of said portal chamber and a substantially closed end wall 20 of said enclosure chamber.

In the preferred embodiment as shown in FIGS. 1,2,3,7, and 9, the enclosure is constructed entirely of transparent plexiglass material and the housing 11 comprises a plurality of side walls 22, a top opening 24 having side grooves 26 a floor 28 and an end wall 20. Referring to FIGS. 2 & 3, said housing includes a plurality of parallel barriers orthogonically positioned with respect to said floor comprising an end wall 20 for substantially enclosing the end of said enclosure chamber, having a bottom air gap 30, an upper intermediate partial wall 32, a lower intermediate partial wall 34 and an entry lower wall 36, constructed as a partial wall.

The portal chamber 14 includes a level ramp typically mounted for tilting between a level position and an inwardly and downwardly position for providing a one way access to the enclosure chamber 16 for trapping a rodent/varmint. The level ramp 38 extends from a position above the portal lower wall 36 to a position immediately above the upper intermediate wall 34 being mounted on a pair of pivots 39.

A sliding top 40 having a pair of channels 42 adapted to associate with grooves 26 is provided adapted for movement between a closed entrapment position and an open release position. As the enclosure 10 is constructed entirely of plexiglass, the bait 12 placed in the enclosure chamber is visible from any position outside the housing 11.

The tilting ramp 38 is typically mounted on a pair of pivots 39 in the portal chamber 14 at mid-position thereof for movement between a normal entry position as shown in FIG. 2, which can also be the normal trapping position once the rodent has entered the inner chamber, and an inwardly tilted position as shown in FIG. 3 to provide access to the enclosure chamber 16. As is shown in FIG. 3, the enclosure chamber includes a bait receiving area 44 on the floor which is visible from outside as well as when entering the chamber, through the open entry 18, as the barrier walls that top and side walls are all constructed of clear plexiglass.

In an alternate embodiment, as shown in FIGS. 4, 5, 6, 8, and 10, the housing 11, is of wooden construction, and rectangular in shape. Entry is via one end, which is open, and which is placed opposite the enclosure chamber 16, at the opposite end of the trap. In this embodiment, the rodent enclosure also contains a plurality of stainless steel nails 46 at the barrier end and in the middle of the trap to prevent the enclosed trapped animal from escaping or chewing said bars. Typically the animal enters at the open entry 18, to retrieve the bait 12 placed at the opposite barrier end 20. As shown in FIG. 9, the trap contains a fixed ramp 48 positioned immediately adjacent and downwardly of the level ramp 38 adapted for moving in see-saw fashion. The weight of the animal forces the ramp 38 in a downward position depositing the animal at the barrier end of the trap where the bait is located in the enclosure chamber 16. The level ramp 38, or see-saw, automatically returns to the normal level position now the trapping position blocking the entrance via the open entry 18. The animal is now trapped in a recessed area of the trap and a barrier wall 48 of stainless steel nails 46 prevents the animal from escaping.

What is claimed is:

1. A rodent enclosure adapted for capturing and retaining alive a rodent comprising:
   a) a plexiglas housing having an entrance end and an enclosed end and including openings at said entrance end and said enclosed end, said plexiglas housing comprising a plurality of sidewalls, a top wall and a floor all constructed of transparent plexiglas material comprising;
      i) a portal chamber adjacent the entrance end having a normally fully opened portal;
      ii) a normally enclosed bait chamber having a substantially closed end,
   b) a tilting ramp normally positioned in a horizontal plane, parallel to the floor, mounted on a pair of pivots having an outer portal portion and a tilting ramp portion adapted to move between a normally level position providing for access to the portal chamber and a tilting position providing access to the bait chamber wherein the outer portal portion is relatively heavier than the tilting portion for automatically returning the tilting ramp to the level position for providing alternatively an access means or a barrier means enabling a rodent to enter the bait enclosure via the tilting ramp and be retained in said bait chamber by a barrier system including the tilting ramp when in level position;

c) controlled egress means for selectively releasing the entrapped rodent unharmed;

d) ventilation means provided in the bait chamber for providing circulation of air through the chamber which comprises a slotted opening to facilitate scenting and to permit ventilation and the source of air for the trapped rodent;

e) barrier means comprising a series of interrelated partial barrier walls configured to operate in association with the tilting ramp and constructed of transparent plexiglas material, including an upper intermediate wall providing a partial barrier at the inner end of the portal chamber, a lower intermediate barrier wall and an end portal lower partial barrier wall for providing an entrance path when the tilting ramp is in the tilting position and for providing a barrier preventing escape when the tilting ramp is in the level position;

f) bait means for luring a rodent into the bait chamber for enclosure therewith in and for providing a food source for sustaining life of a trapped rodent for a period of at least eight hours comprising a ball of peanut butter of at least $\frac{1}{2}''$ in diameter adapted to be positioned in the bait chamber by access through the controlled egress means; wherein a rodent on being attracted to the bait enters the portal chamber by stepping on the generally horizontal tilting ramp, the rodent being lured by sensing the bait, there being openings for scenting at the entrance and in the enclosed end of the housing and which bait is visible from outside the enclosure, and, upon entering the open portal and proceeding inwardly along the horizontal plane of the tilting ramp toward the bait, passes the pivot point of the tilting ramp defined by the pivots, whereupon the weight of the rodent is operative to depress the tilting end of the ramp downwardly, thereby forming an entrance way between the upper partial barrier wall and the floor to provide access for the rodent to exit the ramp and enter the bait chamber, whereupon due to the slightly greater weight of the outer portal portion of the tilting ramp, said tilting ramp automatically returns to its normal level position, closing the access to the bait chamber to enclosure the rodent within the bait chamber with no means of egress.

2. The rodent enclosure of claim 1 wherein the enclosure is entirely constructed of transparent plexiglas material.

3. The rodent enclosure of claim 1 wherein the controlled egress means comprises a transparent sliding top fitted on the top of the housing for movement between a closed entrapment position and an open release position.

4. The rodent enclosure of claim 1 wherein the bait chamber includes life sustaining means comprising a ball of peanut butter of at least $\frac{1}{2}''$ in diameter and a ventilation slot at the base of the end wall.

5. The rodent enclosure of claim 1 wherein the barrier means comprises transparent plexiglas panels.

6. The rodent enclosure of claim 1 wherein the tilting ramp comprises a normally level ramp pivotally mounted in the portal chamber on a pair of pivots which define the pivot point of said ramp adapted for movement between a normally level entry position and an inwardly and a downwardly tilted position configured to automatically return to the level position to prevent egress of an enclosed rodent from the bait chamber.

7. The rodent enclosure of claim 1 wherein the housing has openings at both ends comprising the entrance end and the enclosed end to facilitate ventilation for an enclosed rodent and for scenting the within contained bait by a rodent.

8. A method of entrapping a rodent in a humane, unharmed manner and for sustaining the life of said rodent for a substantial period of time in an enclosure being direct to relocating rodents comprising the steps of:

a) providing a plexiglas enclosure means having a smooth abrasion resistant surface, open at both ends adapted for capturing and retaining a live rodent using bait means including a ball of peanut butter to sustain life for the period of entrapment, said enclosure means comprising;

i) a normally open portal chamber having an open portal at one end;

ii) a normally closed baited enclosure chamber, a substantially closed end of the enclosure chamber, said enclosure means comprising a plurality of transparent side walls, a top wall and a floor;

b) a tilting ramp normally in a level position positioned in the portal chamber providing an access way for permitting access for a rodent to the inner bait enclosure and prevent escape therefrom;

c) a controlled egress top for selectively releasing the entrapped rodent unharmed;

d) the enclosure chamber having a bait receiving area which has openings in both ends to facilitate scenting the within contained bait in the sight of a rodent when opening the open portal;

e) barrier means comprising a plurality of interrelated partial barrier walls constructed of transparent material including an upper intermediate barrier wall providing a upper partial barrier at the end of the open portal, a lower intermediate barrier wall and an end portal lower partial barrier wall;

f) bait means formed in a ball of at least $\frac{1}{2}''$ diameter adapted to be positioned in the bait receiving area via access through the controlled egress top;

g) opening the controlled egress top to provide access for baiting the enclosure means;

h) placing bait comprising peanut butter formed in a ball of at least $\frac{1}{2}''$ in diameter in the bait receiving area of the enclosure chamber;

i) closing the controlled egress top by sliding the top between the open position and a closed position;

j) placing the enclosure means in a first location;

k) trapping a rodent which is visible through the plexiglas sides of the trap;

l) transporting the rodent enclosure within contained small rodent to a second location;

m) slidingly opening the controlled access top of the enclosure means in the second location permitting the rodent to exit the tap in an unharmed condition wherein the rodent on being attracted to enter the enclosure means by sensing the bait, which is visible from outside the enclosure means and having openings for scenting at each end, and upon approaching the open portal, is presented with the open portal with the ramp in a level position, and entering the open portal and proceeding inwardly toward the bait, passes the pivot point of the tilting ramp, the weight of the rodent being operative to depress the inward end of the ramp downwardly, the ramp tilts inwardly and downwardly wherein an inner entrance space is provided below the upper partial barrier and the floor, providing access for the rodent to exit the ramp and enter the enclosure chamber in pursuit of the bait, the slightly greater weight of an entrance portion of the tilting ramp automatically returns the ramp to its normal level position closing the entrance space to the enclosure chamber, thereby enclosing the rodent within the enclosure chamber with no means of egress.

* * * * *